C. F. ERICKSON.
WINDMILL.
APPLICATION FILED APR. 18, 1919.

1,388,994.

Patented Aug. 30, 1921.
4 SHEETS—SHEET 1.

Witness:
R. E. Hamilton

INVENTOR
Chas. F. Erickson
BY
Chas. W. Gerard.
ATTORNEY

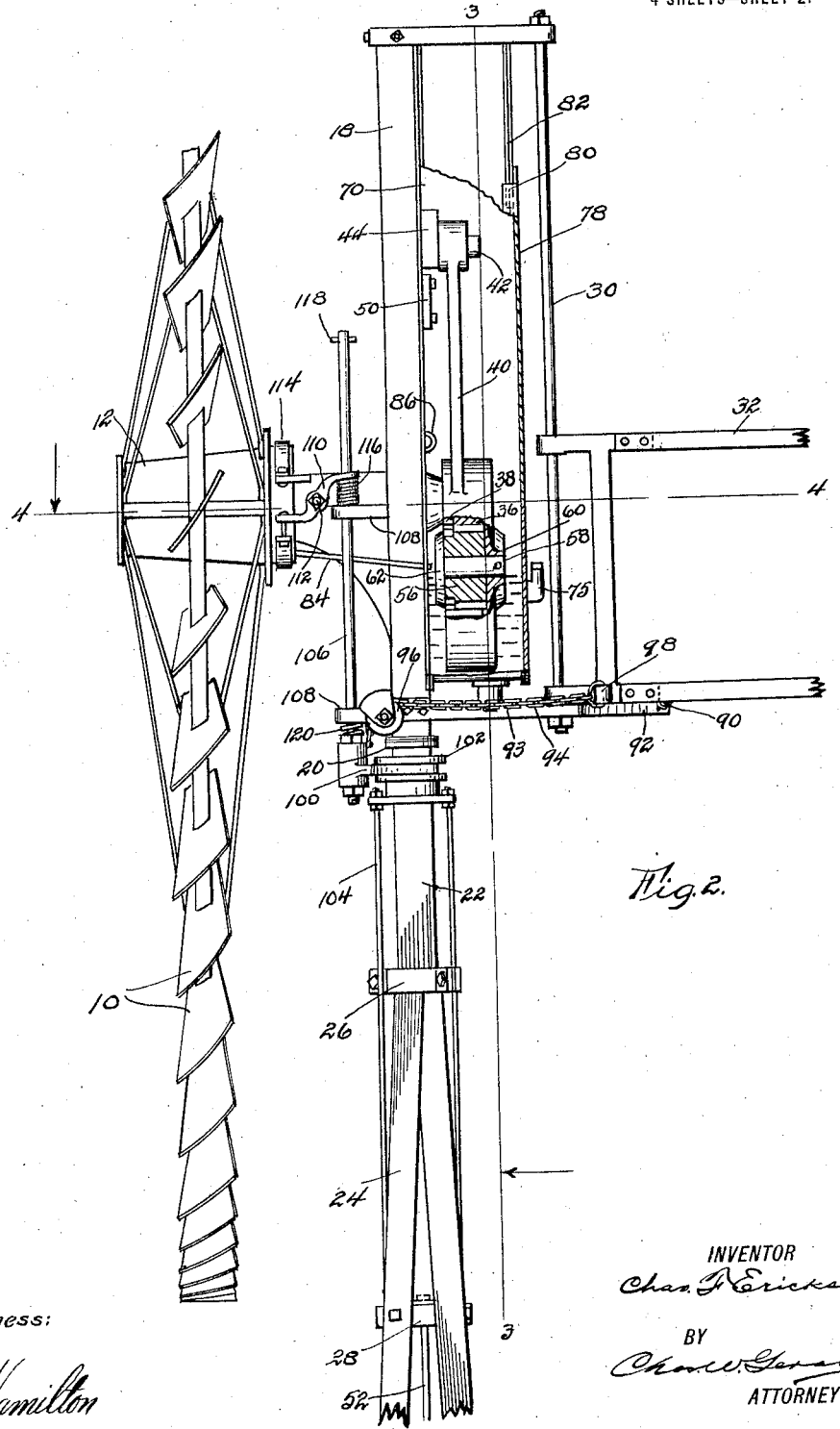

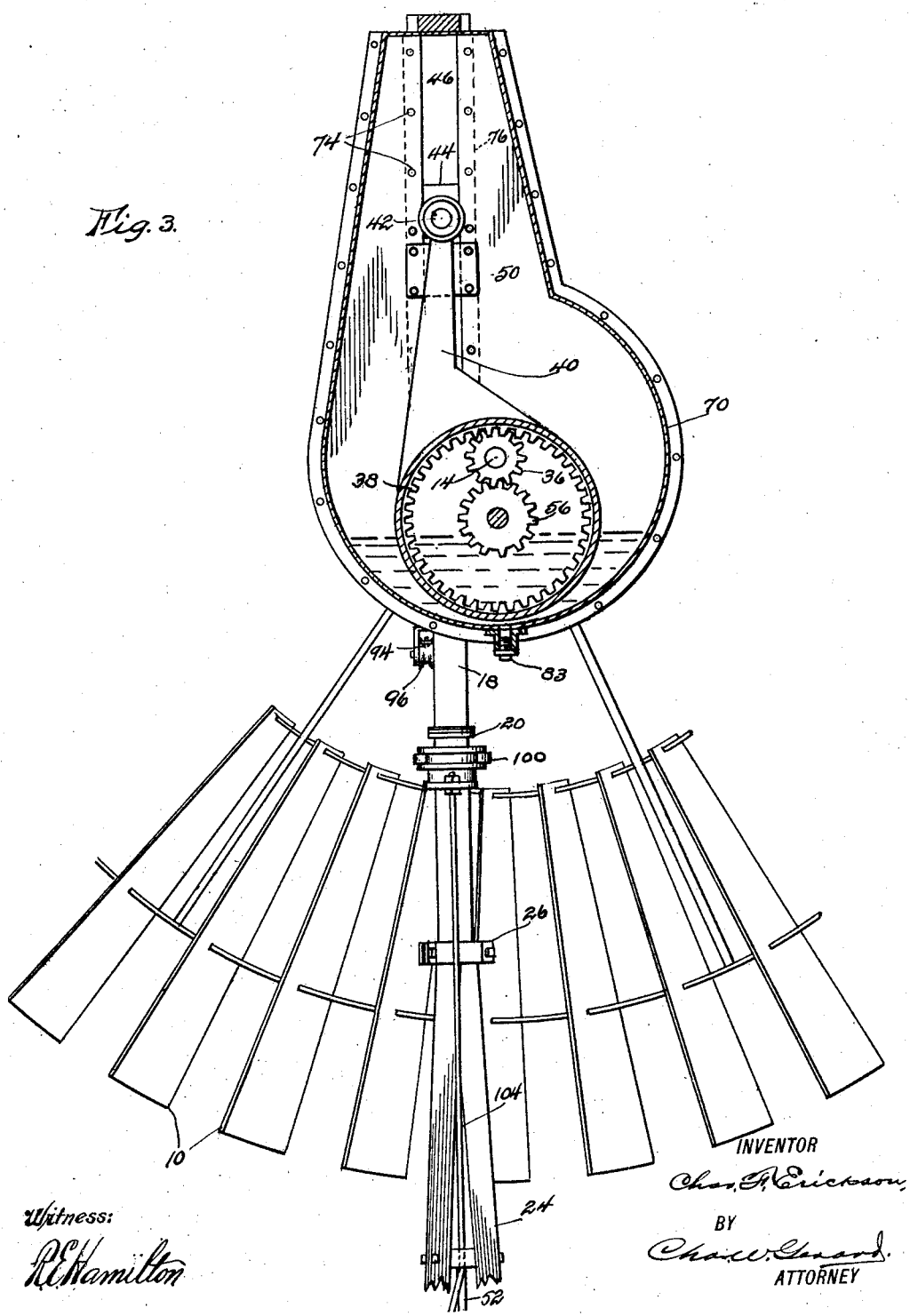

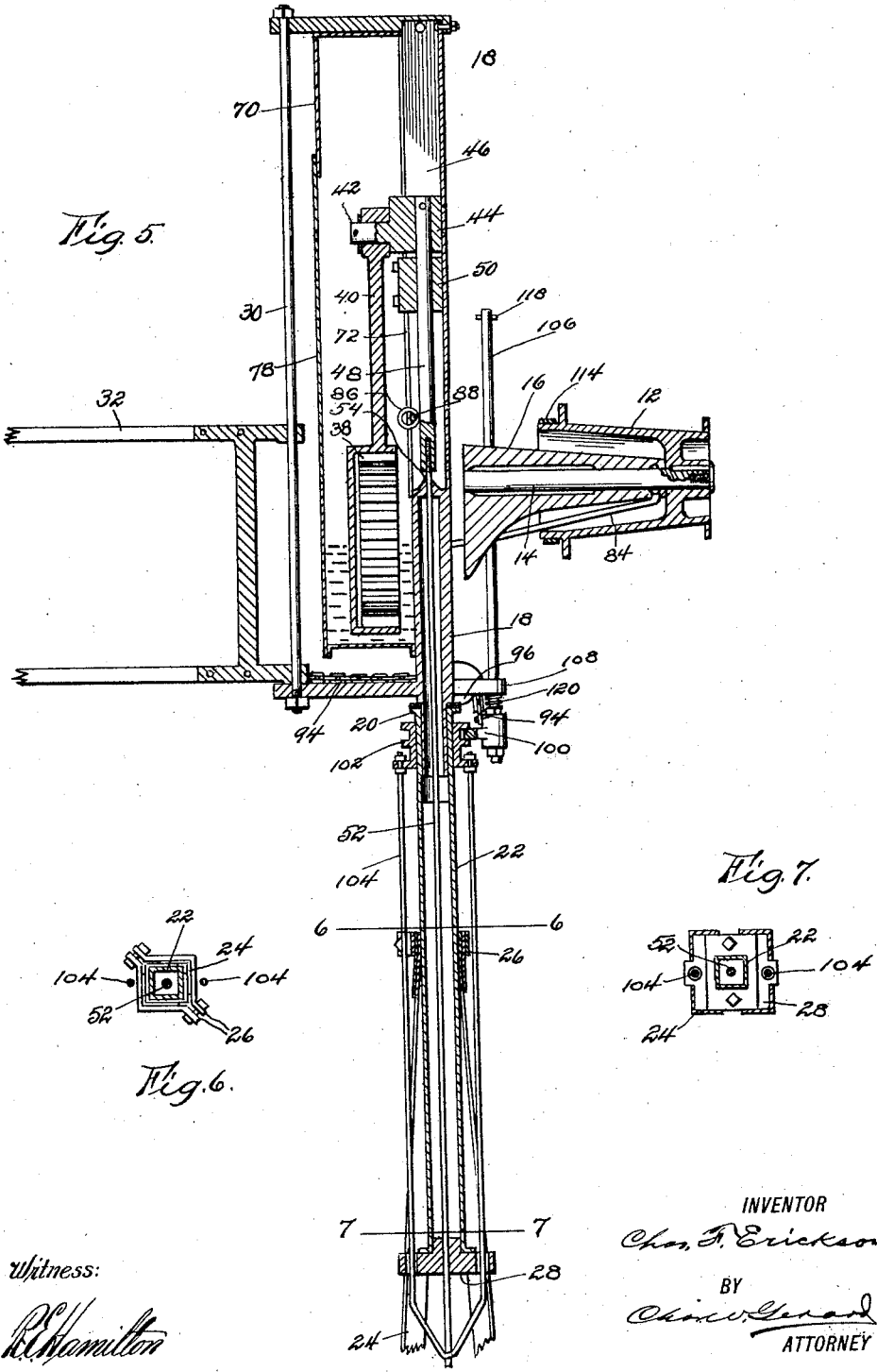

UNITED STATES PATENT OFFICE.

CHARLES F. ERICKSON, OF WETMORE, KANSAS.

WINDMILL.

1,388,994. Specification of Letters Patent. Patented Aug. 30, 1921.

Application filed April 18, 1919. Serial No. 290,991.

*To all whom it may concern:*

Be it known that I, CHARLES F. ERICKSON, a citizen of the United States, residing at Wetmore, in the county of Nemaha, State of Kansas, have invented certain new and useful Improvements in Windmills, of which the following is a complete specification.

The present invention relates to wind mill apparatus, and aims to provide an improved construction whereby a more simple and efficient drive arrangement is established between the wind wheel and the reciprocating plunger rod by which the power is transmitted to the pump or other device to be operated.

To this end I have devised an improved gearing mechanism driven by the wind wheel shaft and including a pitman provided with an internal gear meshing with a pinion on said shaft.

It is also an object of the invention to provide an efficient means for maintaining a proper supply of lubricant in connection with the apparatus and so arranged as to not only shield the gearing mechanism from the elements but also to enable said lubricant to be constantly fed to all the moving parts of the driving mechanism.

It is further sought to devise a strong and durable construction of the type described, adapted to be easily cared for and having very few parts that are likely to get out of order.

With these general objects in view as well as minor objects as will appear in the course of the detail description, the invention will now be described with reference to the accompanying drawings illustrating one practical form of construction which has been devised for embodying the proposed improvements, after which the features therein deemed to be novel will be set forth and defined in the appended claims.

In the drawings—

Fig. 2 is a similar partly sectional view (looking in the opposite direction) on an enlarged scale and with parts broken away;

Fig. 3 is a vertical sectional view, taken on the line 3—3 of Fig. 2;

Fig. 5 is a vertical sectional view, taken on the line 5—5 of Fig. 4; and

Figs. 6 and 7 are transverse sections taken on the lines 6—6 and 7—7, respectively, of Fig. 5.

Figure 1:
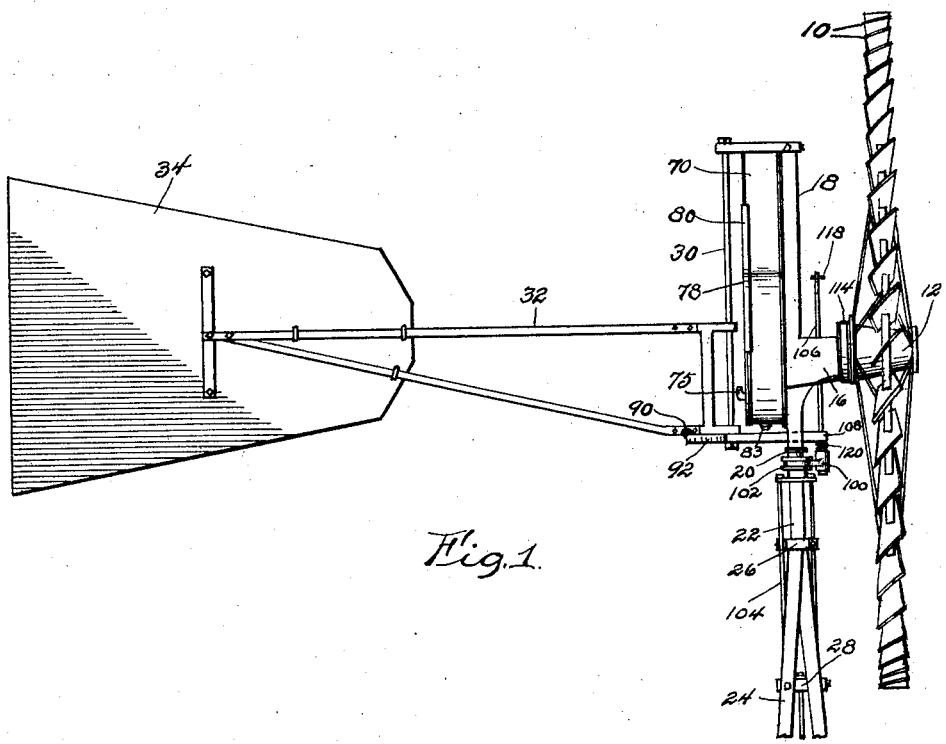
Figure 1 is a side elevation of a wind mill apparatus constructed in accordance with the present invention.

Referring to the drawings in detail, these illustrate a wind wheel comprising the usual fan structure 10 and the hub member 12 secured to the outer end of a horizontal shaft 14 journaled in a bearing 16 projecting out from an upright tower section 18. The lower end of this tower section is supported in a journal bearing 20 (see Fig. 5) at the upper end of a square tubular member 22 which is carried in the main supporting framework 24 of the tower and secured thereto by means of clamps 26 (Fig. 6) and a supporting block 28 (Figs. 5 and 7) embraced and supported by said framework. The tower section 18 also carries a vertical rod 30 on the opposite side from the bearing 16, said rod serving as the pivotal support for a frame 32 carrying a vane 34 (Fig. 1).

Figure 4:
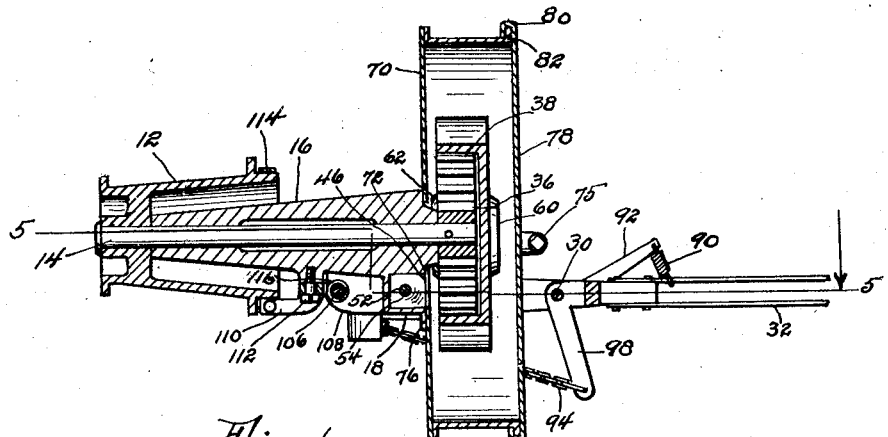
Fig. 4 is a horizontal sectional view, taken on the line 4—4 of Fig. 2.

The wind wheel shaft 12 is provided at its inner end with a gear pinion 36 which meshes with an internal gear 38 formed on the lower end of an angular pitman member 40 as shown in Figs. 3 and 4. The upper end of the pitman member 40 is pivotally connected to a wrist pin 42 projecting out from a slide block 44 mounted in a vertical guideway 46 (Fig. 5) formed in the tower section 18. The block 44 is secured to the upper end of a vertically reciprocating plunger rod 48 operating in a bearing guide 50 and secured to another plunger rod section 52 which extends through a bearing 54 in the tower section 18 and also through a bearing provided in the supporting block 28 (Fig. 5). The wind wheel shaft 12 extends on past and to one side of the axis of the plunger rod 48 so that the wind wheel and its gearing connections are located at opposite sides of the plunger rod, the angular form of the pitman member being provided to facilitate this arrangement of the plunger and the drive shaft 14.

The gear 38 of the pitman member 40 is maintained in proper mesh with the pinion 36 by means of an idle gear wheel 56 journaled on a pin 58 mounted within the hub portion 60 of the gear 38 and coaxially therewith, said pin 58 having a cap portion 62 embracing the outer face of the gear wheel 56.

A housing casing 70 is provided of suitable size and shape for inclosing the pitman member and gear connections and also for maintaining an oil bath for properly lubricating the parts. This housing is supported from the tower section 18, the upper portion of the attaching face of the housing having a vertically arranged opening 72 in register with the guideway 46 formed by said tower section, with the margins of said opening 72 secured by rivets 74 or the like to flanges 76 (see Fig. 4) projecting out from the edges of said guideway. A filling tube 75 is provided on the outer face of the housing for maintaining a bath of oil therein at approximately the level shown in Figs. 3 and 5, and the same face of the housing is also provided with a removable cover 78 having grooved flanges 80 adapted for detachable engagement with marginal outwardly projecting flanges 82 at opposite sides of the housing. At the bottom of the housing an outlet tube fitted with a removable plug 83 is provided for draining purposes. An oil duct 84 leads into the housing 70 from the outer end of the bearing 16, as illustrated in Fig. 5, and for imparting a sufficient quantity of oil for lubricating the plunger rod 48 a ring 86 is loosely mounted upon a pin 88 within the guideway 46 in such a position as to project through the opening 72 into the path of the cap portion 62 of the pin 58 and thereby receive oil by engagement with said cap portion and transmit it to the said plunger rod.

The wind wheel and the vane 34 are normally held in the relation illustrated in the drawings, with said vane at right angles to the plane of the wheel, by the action of an expansion spring 90 secured to the frame 32 and to an arm 92 projecting out from the tower section 18. A furling mechanism is provided for swinging the mill out of the teeth of the wind, this mechanism comprising a chain 94 operating over a sheave wheel 96, with one end of the chain connected to an arm 98 projecting out from the frame 32 of the wind vane, the other end of said chain being secured to a yoke member 100 which rotatably engages a grooved collar 102 mounted slidingly on the tubular upright member 22 and provided with rod connections 104 adapted to be operated by means of suitable further connections (not shown) from the base of the tower. The yoke member 100 also carries a vertically extending rod 106 operating through guide brackets 108 projecting horizontally from the tower section 18, said rod slidingly engaging one arm of a lever 110 fulcrumed on a pin 112 secured to the bearing 16, the other arm of said lever being secured to one end of a brake-band 114 which embraces the hub 12 of the wind wheel. A compression spring 116 is interposed between the rod-engaging end of the lever 110 and the upper bracket 108, said lever being operated to apply the brake-band by the lowering of said rod, whereupon a pin 118 carried by the upper end of said rod engages and rocks the lever against the action of the spring 116. A buffer spring 119 is interposed between the lower guide bracket 108 and the yoke member 100. Thus a simple and convenient means is provided for furling the wind wheel and simultaneously applying the brake device, by the operation of connections which lead from the base of the tower to the sliding collar 102.

From the foregoing it will be apparent that I have provided an efficient and practical construction for carrying out the desired objects of the invention. The arrangement of the drive connections, comprising the pinion on the wind wheel shaft maintained in mesh by means of the idle gear with the internal gear on the pitman member, forms a simple and economical and efficient power transmission for actuating the plunger, the parts being few in number and so compactly arranged as to permit of easy and effective lubrication by the described housing construction. This housing also properly and completely protects the moving parts of the transmission from the elements and affords a simple and convenient means for maintaining the required amount of lubricant for oiling the mechanism and keeping the same in perfect running order, while the removable cover enables the housing to be readily opened for inspection of the driving parts whenever necessary. The described furling device moreover provides an efficient and easily operated means for producing the required swinging movement of the wind wheel in throwing the same into inoperative position and at the same time applying the brake thereto, in a manner which will be readily understood.

While I have illustrated and described what I now deem to constitute the preferred form of embodiment of the improved construction, I desire to reserve the right to make all such formal changes or modifications as may fairly fall within the scope of the appended claims.

Having described the invention, what I claim as new and desire to secure by Letters Patent, is:

1. A wind mill construction comprising a wind wheel, a shaft driven by said wheel and provided with a pinion secured to said shaft, a reciprocating plunger rod, a pitman connected with said plunger rod and formed with an internal gear meshing with said pinion, an idle gear wheel carried by said pinion coaxially with said internal gear and acting to maintain the latter in mesh with said pinion, and a stationary housing inclosing said pitman and carrying an oil bath entered by said gear and its idle wheel at each stroke of said pitman.

2. A wind mill construction comprising a wind wheel, a shaft driven by said wheel and provided with a pinion secured to said shaft, a reciprocating plunger rod, a pitman connected with said plunger rod and formed with an internal gear meshing with said pinion, a stationary housing inclosing said pitman and carrying an oil bath entered by said gear at each stroke of the pitman, and means operating automatically to feed oil from said oil bath and transmit the same to said plunger rod.

3. A wind mill construction comprising a wind wheel, a shaft driven by said wheel and provided with a pinion secured to said shaft, a reciprocating plunger rod, a pitman connected with said plunger rod and formed with an internal gear meshing with said pinion, a stationary housing inclosing said pitman and carrying an oil bath entered by said gear at each stroke of the pitman, a loosely mounted ring engaging said plunger rod, and a part carried by said pitman operating to engage and feed oil to said ring at each reciprocation of the pitman.

In witness whereof I hereto affix my signature.

CHARLES F. ERICKSON.